US006897399B2

(12) United States Patent
Tsuda et al.

(10) Patent No.: US 6,897,399 B2
(45) Date of Patent: May 24, 2005

(54) HOLLOW METAL OBJECT AND METHOD OF ITS FABRICATION

(75) Inventors: Akira Tsuda, Itami (JP); Masatada Numano, Itami (JP); Yoshihiro Nakai, Osaka (JP); Tsuyoshi Nomura, Osaka (JP); Takashi Kondo, Maebashi (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 31 days.

(21) Appl. No.: 10/248,948

(22) Filed: Mar. 4, 2003

(65) Prior Publication Data

US 2003/0180568 A1 Sep. 25, 2003

(30) Foreign Application Priority Data

Mar. 22, 2002 (JP) ........................................ 2002-079945

(51) Int. Cl.[7] ............................... B23H 1/04; F16L 9/02
(52) U.S. Cl. ................... 219/69.15; 138/171; 428/36.9; 428/586; 428/592; 428/611
(58) Field of Search .......................... 219/69.15, 69.12, 219/72; 138/171; 438/36.9, 586, 592, 611; 428/36.9, 586, 592, 611

(56) References Cited

U.S. PATENT DOCUMENTS

| 3,568,722 | A | * | 3/1971 | Runshe et al. ............... 138/133 |
| 4,448,655 | A | * | 5/1984 | Inoue .......................... 205/686 |
| 4,797,527 | A | * | 1/1989 | Yamamoto et al. ......... 219/69.15 |
| 2002/0179166 | A1 | * | 12/2002 | Houston et al. ............... 138/39 |

FOREIGN PATENT DOCUMENTS

| JP | 57-144630 A | * | 9/1982 | .............. 219/69.15 |
| JP | 57-144632 A | * | 9/1982 | .............. 219/69.15 |
| JP | 2001-157925 A | * | 6/2001 | |

* cited by examiner

Primary Examiner—Geoffrey S. Evans
(74) Attorney, Agent, or Firm—James Judge

(57) ABSTRACT

Manufacturing narrow-diameter hollow metal objects utilizing metals difficult to work plastically has been problematic with conventional manufacturing methods; the narrower the diameter the higher the manufacturing cost has been, and under some circumstances manufacturing has been impossible. A plurality of metal wires is worked into a twisted wire cluster, adjoining companion metal wires are brought into contact in planar contacting portions, and the cluster is made unitary by supplying an adhesive agent along the outer side, producing a hollow metal object possessing a uniform inner diameter and a clean inner surface.

33 Claims, 1 Drawing Sheet

HOLLOW METAL OBJECT AND METHOD OF ITS FABRICATION

BACKGROUND OF INVENTION

1. Field of the Invention

The present invention relates to hollow metal objects possessing a space in the core portion enabling the of passing fluids such as liquids and gasses through the space.

2. Description of the Background Art

Hollow metal objects have to date been utilized as piping or tubing, as conduits for passing fluids such as gasses and liquids, and further, as components for forming the framework of structures. Owing to metals' abundant ductility, their capacity for being worked plastically, and the suitable rigidity they posses, they are useful in fields that demand complex shapes to which resins and sintered materials cannot be adapted. The electro-conductivity that metals posses, furthermore, enables using them as part of electrical circuitry. Likewise, because these properties may be freely selected according to type of metal, processing level, heat treatment, etc., their industrial fields of use have grown extremely wide-ranging.

Especially with hollow metal objects, small-diameter tubing whose outer diameter is several mm or less is finding practical applications, apart from use as ordinary fluid passages, in specialized applications such as electrodes in electro-discharge machining of fine holes, and in medical instruments. Owing to demands that mechanical strength be secured to a certain extent, it is desirable to utilize tungsten or molybdenum—which are high-melting-point metals—or stainless steel, as raw materials in these applications.

With their plastic deformation ability being generally low at room temperature, high-melting-point metals are materials that are difficult to work, and are therefore not readily fabricated into hollow forms, compared with other, soft metals. A method that, by working metal filaments into twisted wire and brazing—by filling with a brazing filler— the gaps between companion filaments, provides a hollow metal object for electro-discharge machining is disclosed in Japanese Pub. Pat. App. 2001-157925 as a technique for fabricating a hollow form from a high-melting-point metal.

Pipe-drawing, spiraling, and seaming techniques are generally employed as methods of fabricating hollow metal objects. These methods are flourishingly used as means for manufacturing hollow forms of comparatively large diameter from metals rich in ductility, but are extremely difficult to apply to situations, which are the target of the present invention, in which small-diameter tubing of 1 mm or less maximum diameter is manufactured, and in which low-plastic-workability, high-melting-point metals are the raw material. Because this requires imparting considerable plastic deformation to the material serving as the raw material in manufacturing small-diameter hollow forms, securing the dimensional precision and formational precision of the finished product has been exceedingly problematic, even given that processing by repeatedly implementing deformation and annealing steps has been possible.

To counter these difficulties, with the hollow metal object disclosed in Japanese Pub. Pat. App. 2001-157925 first-metal filaments that will constitute the metal hollow form are twisted together around second-metal filaments that serve as a brazing material, and by thereafter heating to or above the melting point of the filaments of the second metal that serve as a brazing material, the filaments of the first metal are brazed, yielding a manufactured hollow metal object. Although manufacturing thin hollow metal objects whose maximum diameter is 0.04 mm to 0.5 mm has been possible with this method, the thickness of the brazing filler inside the hollow form turns out to be unstable; moreover, protrusions due to interfering matter and bubbles have been prone to arise, which in practice have proven to be a cause of blockage in passing fluids.

SUMMARY OF INVENTION

An object of the present invention is to resolve the problems described above, and use a choice of metal raw materials to provide a small-diameter hollow metal object.

A first embodiment according to the present invention is characterized in that a plurality of wires 1 made from a first metal and twisted helically to contain a hollow have planar contact surfaces between adjoining wires; and a second metal 2 whose melting point is lower than that of the first metal is filled into the helical indentation formed along the outside of the hollow form, and the plurality of wires 1 that constitute the hollow form are welded to each other by means of the second metal 2. A sectional view of a hollow metal object that represents this embodiment is shown in FIG. 1. Lending planarity to the contact surfaces between the wires 1 made from the first metal makes a firmer joint possible in the welding action of the second metal 2 entering thinly between the surfaces, heightening the rigidity of the hollow metal object. Likewise, because the gap between these surfaces is small, the second metal 2 being filled into the helical indentation formed along the outside of the hollow form does not seep into the interior of the hollow metal object, which keeps the interior surface of the hollow metal object clean.

A second embodiment according to the present invention is characterized in that a plurality of wires 1 made from a first metal superficially clad with a third metal 3 and twisted helically to contain a hollow have planar contact surfaces between adjoining wires; and an adhesive-agent or resin hardening substance 2 is filled into the helical indentation formed along the outside of the hollow form, and the plurality of wires 1 that constitute the hollow form are affixed to each other by means of the hardening substance 2. A sectional view of a hollow metal object that represents this embodiment is shown in FIG. 2. The present construction furnishes the features of the foregoing first embodiment; furthermore, appropriately selecting the type of third metal 3 makes it possible to impart requisite flushness to the inner face of the hollow metal object. Moreover, if the wettability of the second metal with the first metal is not adequate, selecting as the third metal a metal whose wettability with the second metal is favorable makes it possible to improve the welding performance of the second metal, and to improve the strength and gastightness of the hollow metal object.

A third embodiment according to the present invention is characterized in that a plurality of wires 1 made from a first metal superficially clad with a fourth metal 4 and twisted helically to contain a hollow have planar contact surfaces between adjoining wires; and by means of the fourth metal 4, whose melting point is lower than that of the first metal, fusing wire to wire in the hollow form, the plurality of wires 1 are welded to each other. A sectional view of a hollow metal object that represents this embodiment is shown in FIG. 3. Adopting the present construction makes it possible to gain further improvement in the joint strength of a hollow metal object furnished the features of the foregoing first embodiment, and improvement in the internal/external gastightness of the hollow metal object.

A fourth embodiment according to the present invention is characterized in that a plurality of wires 1 made from a first metal, or otherwise a plurality of wires 1 made from a first metal clad with a third metal 3, and twisted helically to contain a hollow have planar contact surfaces between adjoining wires of the plurality; and a second metal 2 whose melting point is lower than that of the first metal is filled into the helical indentation formed along the outside of the hollow form, and the plurality of wires 1 that constitute the hollow form are welded to each other by means of the second metal 2. A sectional view of a hollow metal object that represents this embodiment is similar to that shown in FIG. 2. A hollow metal object furnished with the features of the foregoing first embodiment may be manufactured at low cost through the present construction.

A hollow metal object according to the present invention is preferably 0.04 mm or more and 1 mm or less in maximum outside diameter. Although it has been extremely difficult to produce hollow metal objects 1 mm or less in maximum outside diameter using conventional hollow-metal-form manufacturing techniques, the method by the present invention enables manufacturing hollow metal objects of a minimum 0.04 mm in maximum diameter, irrespective of the material. The maximum diameter being less than 0.04 mm would hinder working the form into the twisted-wire configuration. Likewise, hollow metal objects whose maximum diameter exceeds 1 mm can be readily produced by conventional manufacturing techniques and would not entail applying the present invention.

While all workable metals are available as wire according to the present invention, hollow metal objects in particular utilizing a material selected from molybdenum, tungsten, copper, nickel, titanium, iron, zinc, and alloys having these as chief components will exhibit suitable characteristics. Wherein a hollow metal object by the present invention is in particular to be utilized as an electrode for electro-discharge machining, it is preferable to utilize as the first metal tungsten or molybdenum to which a trace amount of a metal whose work index is large, such as cerium or thorium, has been added, because this serves to step up the processing speed.

In a separate embodiment according to the present invention, moreover, the hollow metal object may have on its skin a highly electro-conductive metal such as gold, silver, copper or aluminum, or a cladding layer made up of an alloy of these, 0.1 to 100 $\mu$m in thickness. This cladding layer enables enhancing electrical conductivity of the hollow metal object as a whole, and enables providing suitable electrical conductivity in accordance with the application. In the same way, furthermore, the hollow metal object may have on its skin a highly corrosion-resistant metal such as nickel or chrome, or a cladding layer made up of an alloy of these, 0.1 $\mu$m to 100 $\mu$m in thickness. This cladding layer makes it possible to employ a copper hollow metal object under a corrosive environment, and also can prevent the substances that constitute the hollow metal object from eluting into the environment.

In a separate embodiment according to the present invention, moreover, the hollow metal object may have an insulative coating film 0.5 $\mu$m to 20 $\mu$m in thickness. Adopting this construction makes it possible, when the hollow metal object is utilized for example as an electrode for electro-discharge machining, to prevent excess discharge, and to improve the dimensional precision and flushness of the workpiece.

The present invention sets out being characterized in applying compression by means of a die to said plurality of wires when being helically twisted, so as to reduce their maximum diameter by a 2% or more and 20% or less range. Putting the hollow metal object through the present process enables imparting to it the features mentioned in the above-noted first embodiment of the present invention and thereafter. Here, if the extent of compression measured at the maximum diameter is less than 2%, portions of the companion wires, in the plurality made from the first metal, whose contact is not planar appear and the firm wire-to-wire bonding that is a feature of the present invention cannot be gained; moreover, the brazing filler and the adhesive components that are situated in the outside of the hollow metal object seep into the interior of the hollow metal object and become a source of incidents of contamination of, and protrusions on, the interior surface. Likewise, if the extent of this compression exceeds 20%, the plurality of wires made of the first metal that constitute a hollow metal form undergo excessive deformation, destabilizing the structure of the hollow metal object. To employ low-workability metals such as tungsten and molybdenum as the first metal, furthermore, would render the hollow metal object unworkable.

In the present invention any of hot-dip plating, electroplating, chemical plating, vapor deposition, or metal-powder paste application methods, or a combination of these, can be utilized as a technique for filling the second or else the fourth metal into the helical indentation formed in the outside surface of said plurality of wires made from a first metal and twisted helically to contain a hollow. These methods enable supplying the required substances uniformly in just the amount expected into the indentation area along the outside of the hollow metal object.

Hollow metal objects according to the present invention may in terms of industrial applications be utilized advantageously as electro-discharge machining electrodes, fluid-conveying metal piping, and protective tubing.

From the following detailed description in conjunction with the accompanying drawings, the foregoing and other objects, features, aspects and advantages of the present invention will become readily apparent to those skilled in the art.

DETAILED DESCRIPTION

Figure 1:
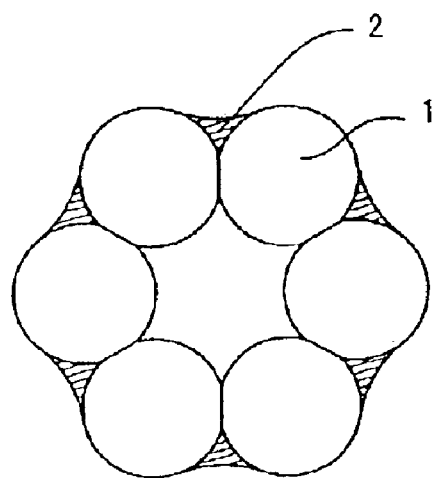
FIG. 1 is a sectional view of a hollow metal object illustrating an embodiment of the present invention.
Figure 2:
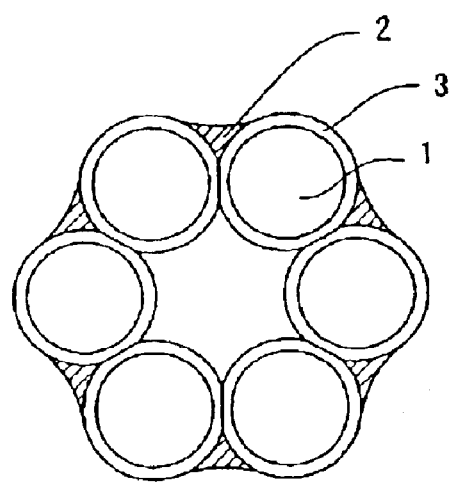
FIG. 2 is a sectional view of a hollow metal object illustrating a different embodiment of the present invention.
Figure 3:
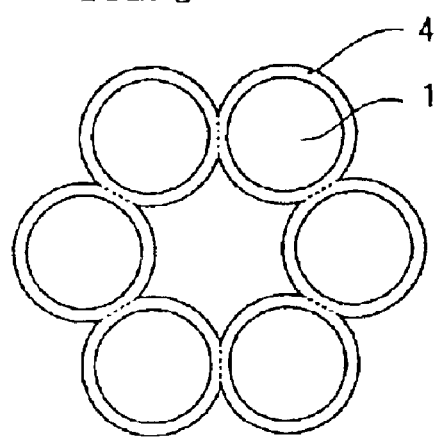
FIG. 3 is sectional view of a hollow metal object illustrating a still different embodiment of the present invention.

Modes of embodying hollow metal objects according to the present invention will be explained below by means of embodiment examples.

EMBODIMENT EXAMPLE 1

Ten strands of tungsten wire 23.6 $\mu$m in diameter, thinly plated with 1 $\mu$m or less nickel, were twisted together while applying 5% compression through the maximum diameter, yielding a twisted wire cluster 95 $\mu$m in maximum outer diameter. Silver paste was filled and spread into the spiral indentation formed in the outside, and onto the outer surface, of the cluster; and afterwards brazing was carried out by continuous heating within a 1050-degree non-oxidizing atmosphere. A hollow metal object having an outside diameter of 100 μm and tensile strength of 2000 N/mm² was obtained as a result. With a 20 cm length of this cut off as a tube electrode for fine-hole electro-discharge machining, drilling into cemented carbide 6 mm thick was carried out, enabling a perforation 135 μm in upper-hole diameter (hole diameter on the side the electrode initially worked on) and 145 μm in lower hole diameter (hole diameter on the side the electrode finally worked on) to be made.

For comparison the same process as noted above was carried out using a copper tube 100 μm in outside diameter, which has been employed conventionally, wherein with a 145 μm upper-hole diameter and 230 μm lower-hole diameter, as far as dimensional precision is concerned, the hollow metal object of the present invention was superior.

EMBODIMENT EXAMPLE 2

Ten strands of molybdenum wire 23.6 μm in diameter, thinly plated with 1 μm or less nickel, were twisted together while applying 5% compression through the maximum diameter, yielding a twisted wire cluster 95 μm in maximum outer diameter. Silver paste was filled and spread into the spiral indentation formed in the outside, and onto the outer surface, of the cluster; and afterwards brazing was carried out by continuous heating within a 1050-degree non-oxidizing atmosphere. A hollow metal object 100 μm in outside diameter and whose tensile strength was 2000 N/mm² was obtained as a result. On the surface thereof an approximately 1 μm enamel coating film was furthermore formed. With a 20 cm length of this cut off as a tube electrode for fine-hole electro-discharge machining, drilling into cemented carbide 6 mm thick was carried out, enabling a perforation 130 μm in upper-hole diameter and 135 μm in lower hole diameter to be made.

EMBODIMENT EXAMPLE 3

Seven strands of tungsten wire clad with silver in a thickness of 1 μm and having a diameter of 23 μm were twisted together while applying 3% compression in the overall maximum diameter such that a twisted wire cluster having a maximum outer diameter of 73 μm was obtained. Following that, the cluster was brazed by continuous heating within a 1050-degree non-oxidizing atmosphere. A hollow metal object having an outside diameter of 80 μm and tensile strength of 2100 N/mm² was obtained as a result. With a 20 cm length of this cut off as a tube electrode for fine-hole electro-discharge machining, drilling into cemented carbide 6 mm thick was carried out, enabling a perforation 125 μm in upper-hole diameter and 135 μm in lower hole diameter to be made.

EMBODIMENT EXAMPLE 4

Ten strands of tungsten wire 23.6 μm in diameter, thinly plated with 1 μm or less nickel, were twisted together while applying 10% compression through the maximum diameter, yielding a twisted wire cluster 90 μm in maximum outer diameter. Following that, zinc was vapor-deposited on its surface by continuous passage through zinc vapor. A hollow metal object 100 μm in outside diameter and whose tensile strength was 2000 N/mm² was obtained as a result. With a 20 cm length of this cut off as a tube electrode for fine-hole electro-discharge machining, drilling into cemented carbide 6 mm thick was carried out, enabling a perforation 135 μm in upper-hole diameter and 145 μm in lower hole diameter to be made.

EMBODIMENT EXAMPLE 5

Ten strands of brass wire 236 μm in diameter were twisted together while applying 5% compression through the maximum diameter, yielding a twisted wire cluster 950 μm in maximum outer diameter. Following that, a hollow metal object 1 mm in outside diameter and whose tensile strength was 600 N/mm² was obtained by continuous electroplating with zinc. This as a result enabled roughly halving the manufacturing cost compared with conventional brass tubing.

EMBODIMENT EXAMPLE 6

Seven strands of tungsten wire 23 μm in diameter, thinly plated with 1 μm or less nickel, were twisted together while applying 20% compression through the maximum diameter, yielding a twisted wire cluster 64 μm in maximum outer diameter. Silver paste was filled and spread into the spiral indentation formed in the outside, and onto the outer surface, of the cluster; and afterwards brazing was carried out by continuously heating within a 1050-degree non-oxidizing atmosphere. A hollow metal object 70 μm in outside diameter and whose tensile strength was 2200 N/mm² was obtained as a result. Utilizing the obtained hollow metal object, a painless needle for ultra-trace blood sampling was produced, and in implementing blood-passage testing, compared with a conventional blood-drawing needle made of stainless steel incidence of blood coagulation dropped to under half.

By means of a configuration through the present invention explained in the foregoing, hollow metal objects 1 mm or less in diameter not manufacturable by conventional methods may be produced with favorable precision and at low cost. In terms of the present invention, fine-diameter hollow metal objects can be manufactured, in particular even with high-melting-point metals that are difficult to work plastically; and the hollow metal objects may be utilized advantageously as electrodes for electro-discharge machining and conduits for fluid passage.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A hollow metal object comprising:
   a plurality of wires made of a first metal, twisted helically into a form containing a hollow, and such that adjoining surfaces where said wires of the plurality contact are planar and such that a helical indentation is formed outwardly in the hollow form; and
   a second metal whose melting point is lower than that of said first metal, filled into the helical indentation and welding together said wires of the plurality constituting the hollow form.

2. The hollow metal object set forth in claim 1, wherein the hollow said metal object is twisted helically to contain is 0.04 mm or more and 1 mm or less in maximum outside diameter.

3. The hollow metal object set forth in claim 1, wherein said first metal twisted helically to contain a hollow is selected from molybdenum, tungsten, copper, nickel, titanium, iron, zinc, and alloys having these as chief components.

4. The hollow metal object set forth in claim 1, having on its skin a metal made of gold, silver, copper, aluminum, nickel or chrome, or a cladding layer made up of an alloy of these, 0.1 μm or more and 100 μm or less in thickness.

5. The hollow metal object set forth in claim 1, having on its outermost layer an insulative coating film 0.5 μm or more and 20 μm or less in thickness.

6. An electrode for electro-discharge machining, said electrode utilizing the hollow metal object set forth in claim 1.

7. Metal piping for conveying fluids, said metal piping utilizing the hollow metal object set forth in claim 1.

8. A method of manufacturing a hollow metal object set forth in claim 1, the method comprising:
   helically twisting a plurality of wires made from a first metal into a form containing a hollow, and such that adjoining surfaces where the wires of the plurality contact are planar and such that a helical indentation is formed outwardly in the hollow form; and
   filling a second metal whose melting point is lower than that of the first metal into the helical indentation by any of hot-dip plating, electroplating, chemical plating, vapor deposition, or metal-powder paste application methods, or a combination of these, to weld together the wires of the plurality constituting the hollow form.

9. A hollow metal object comprising:
   a plurality of wires made of a first metal superficially clad with a third metal, twisted helically into a form containing a hollow, and such that adjoining surfaces where said wires of the plurality contact are planar and such that a helical indentation is formed outwardly in the hollow form; and
   a second metal whose melting point is lower than that of said first metal, filled into the helical indentation and welding together said wires of the plurality constituting the hollow form.

10. The hollow metal object set forth in claim 9, wherein the hollow said metal object is twisted helically to contain is 0.04 mm or more and 1 mm or less in maximum outside diameter.

11. The hollow metal object set forth in claim 9, wherein said first metal twisted helically to contain a hollow is selected from molybdenum, tungsten, copper, nickel, titanium, iron, zinc, and alloys having these as chief components.

12. The hollow metal object set forth in claim 9, having on its skin a metal made of gold, silver, copper, aluminum, nickel or chrome, or a cladding layer made up of an alloy of these, 0.1 μm or more and 100 μm or less in thickness.

13. The hollow metal object set forth in claim 9, having on its outermost layer an insulative coating film 0.5 μm or more and 20 μm or less in thickness.

14. An electrode for electro-discharge machining, said electrode utilizing the hollow metal object set forth in claim 9.

15. Metal piping for conveying fluids, said metal piping utilizing the hollow metal object set forth in claim 9.

16. A method of manufacturing a hollow metal object set forth in claim 9, the method comprising:
   helically twisting a plurality of wires made from a first metal superficially clad with a third metal into a form containing a hollow, and such that adjoining surfaces where the wires of the plurality contact are planar and such that a helical indentation is formed outwardly in the hollow form;
   filling a second metal whose melting point is lower than that of the first metal into the helical indentation by any of hot-dip plating, electroplating, chemical plating, vapor deposition, or metal-powder paste application methods, or a combination of these, to weld together the wires of the plurality constituting the hollow form.

17. A hollow metal object comprising:
   a plurality of wires made of a first metal, twisted helically into a form containing a hollow, and such that adjoining surfaces where said wires of the plurality contact are planar, and
   a fourth metal whose melting point is lower than that of the first metal, cladding said wires and, by fusing wire to wire in the hollow form, welding said plurality of wires to each other.

18. The hollow metal object set forth in claim 17, wherein the hollow said metal object is twisted helically to contain is 0.04 mm or more and 1 mm or less in maximum outside diameter.

19. The hollow metal object set forth in claim 17, wherein said first metal twisted helically to contain a hollow is selected from molybdenum, tungsten, copper, nickel, titanium, iron, zinc, and alloys having these as chief components.

20. The hollow metal object set forth in claim 17, having on its skin a metal made of gold, silver, copper, aluminum, nickel or chrome, or a cladding layer made up of an alloy of these, 0.1 μm or more and 100 μm or less in thickness.

21. The hollow metal object set forth in claim 17, having on its outermost layer an insulative coating film 0.5 μm or more and 20 μm or less in thickness.

22. An electrode for electro-discharge machining, said electrode utilizing the hollow metal object set forth in claim 17.

23. Metal piping for conveying fluids, said metal piping utilizing the hollow metal object set forth in claim 17.

24. A hollow metal object comprising:
   a plurality of wires made of a first metal, or otherwise a plurality of wires made from a first metal clad with a third metal, twisted helically into a form containing a hollow, and such that adjoining surfaces where said wires of the plurality contact are planar and such that a helical indentation is formed outwardly in the hollow form; and
   a hardening substance made either of an adhesive agent or a resin, filled into the helical indentation and affixing to each other said wires of the plurality constituting the hollow form.

25. The hollow metal object set forth in claim 24, wherein the hollow said metal object is twisted helically to contain is 0.04 mm or more and 1 mm or less in maximum outside diameter.

26. The hollow metal object set forth in claim 24, wherein said first metal twisted helically to contain a hollow is selected from molybdenum, tungsten, copper, nickel, titanium, iron, zinc, and alloys having these as chief components.

27. The hollow metal object set forth in claim 24, having on its outermost layer an insulative coating film 0.5 μm or more and 20 μm or less in thickness.

28. An electrode for electro-discharge machining, said electrode utilizing the hollow metal object set forth in claim 24.

29. Metal piping for conveying fluids, said metal piping utilizing the hollow metal object set forth in claim 24.

30. A method of manufacturing a hollow metal object, the method comprising:
   helically twisting a plurality of wires made from a first metal into a form containing a hollow, and such that adjoining surfaces where the wires of the plurality contact are planar and such that a helical indentation is formed outwardly in the hollow form;

applying compression by means of a die to the plurality of wires when being helically twisted, so as to reduce their maximum diameter by a 2% or more and 20% or less range; and filling a second metal whose melting point is lower than that of the first metal into the helical indentation, to weld together the wires of the plurality constituting the hollow form.

31. A method of manufacturing a hollow metal object, the method comprising:

helically twisting a plurality of wires made from a first metal superficially clad with a third metal into a form containing a hollow, and such that adjoining surfaces where the wires of the plurality contact are planar and such that a helical indentation is formed outwardly in the hollow form;

applying compression by means of a die to the plurality of wires when being helically twisted, so as to reduce their maximum diameter by a 2% or more and 20% or less range; and filling a second metal whose melting point is lower than that of the first metal into the helical indentation, to weld together the wires of the plurality constituting the hollow form.

32. A method of manufacturing a hollow metal object, the method comprising:

helically twisting a plurality of wires made from a first metal, superficially clad with a fourth metal whose melting point is lower than that of the first metal, into a form containing a hollow, and such that adjoining surfaces where the wires of the plurality contact are planar;

applying compression by means of a die to the plurality of wires when being helically twisted, so as to reduce their maximum diameter by a 2% or more and 20% or less range; and with the fourth metal, fusing wire to wire in the hollow form to weld the plurality of wires to each other.

33. A method of manufacturing a hollow metal object, the method comprising:

helically twisting a plurality of wires made of a first metal, or otherwise a plurality of wires made from a first metal clad with a third metal, into a form containing a hollow, and such that adjoining surfaces where the wires of the plurality contact are planar and such that a helical indentation is formed outwardly in the hollow form;

applying compression by means of a die to the plurality of wires when being helically twisted, so as to reduce their maximum diameter by a 2% or more and 20% or less range; and filling a hardening substance, made either of an adhesive agent or a resin, into the helical indentation to affix to each other the wires of the plurality constituting the hollow form.

* * * * *